United States Patent [19]

Schultz et al.

[11] Patent Number: 5,721,323
[45] Date of Patent: Feb. 24, 1998

[54] CURE INHIBITED EPOXY RESIN COMPOSITIONS AND LAMINATES PREPARED FROM THE COMPOSITIONS

[75] Inventors: Craig E. Schultz, Richwood; James L. Bertram, Lake Jackson; William A. Clay, Angleton; Guang-Ming Xia, Lake Jackson, all of Tex.; Joseph Gan, Strasbourg, France

[73] Assignee: The Dow Chemical Company, Midland, Mich.

[21] Appl. No.: 773,697

[22] Filed: Dec. 27, 1996

Related U.S. Application Data

[63] Continuation of Ser. No. 146,652, Nov. 2, 1993, abandoned, which is a continuation-in-part of Ser. No. 848,477, Mar. 6, 1992, Pat. No. 5,314,720, which is a division of Ser. No. 526,487, May 21, 1990, abandoned.

[51] Int. Cl.$^6$ .................... C08G 8/28; C08L 283/00
[52] U.S. Cl. .................... 525/504; 525/506; 525/523; 528/88; 528/91; 528/92; 528/93; 528/94
[58] Field of Search .................... 525/504, 506, 525/523; 528/88, 91, 92, 93, 94

[56] References Cited

U.S. PATENT DOCUMENTS

| | | | |
|---|---|---|---|
| 3,048,552 | 8/1962 | Fang | 523/456 |
| 3,136,736 | 6/1964 | Washburne | 525/119 |
| 3,565,861 | 2/1971 | White et al. | 528/107 |
| 3,738,862 | 6/1973 | Klarquist et al. | 428/386 |
| 3,947,345 | 3/1976 | Ogota et al. | 204/617 |
| 4,069,055 | 1/1978 | Civello | 430/280.1 |
| 4,318,766 | 3/1982 | Smith | 156/330 |
| 4,322,456 | 3/1982 | Martin | 427/195 |
| 4,358,578 | 11/1982 | Brownscombe | 528/91 |
| 4,360,649 | 11/1982 | Kamio | 525/484 |
| 4,410,596 | 10/1983 | Whiteside, Jr. et al. | 428/413 |
| 4,438,254 | 3/1984 | Doorakian | 528/89 |
| 4,544,732 | 10/1985 | Corley | 528/90 |
| 4,554,342 | 11/1985 | Corley | 528/90 |
| 4,581,436 | 4/1986 | Corley | 528/90 |
| 4,594,291 | 6/1986 | Bertram et al. | 428/415 |
| 4,631,306 | 12/1986 | Markert | 523/457 |
| 4,692,504 | 9/1987 | Frank | 528/89 |
| 4,725,652 | 2/1988 | Bertram et al. | 525/485 |
| 4,766,196 | 8/1988 | Goel et al. | 528/89 |
| 4,775,734 | 10/1988 | Goel | 528/89 |
| 4,925,901 | 5/1990 | Bertram et al. | 525/482 |
| 4,946,817 | 8/1990 | Bertram et al. | 502/154 |
| 5,134,239 | 7/1992 | Bertram et al. | 546/112 |
| 5,169,473 | 12/1992 | Bertram et al. | 156/307.4 |

FOREIGN PATENT DOCUMENTS

| | | |
|---|---|---|
| 236117 | 8/1959 | Australia. |
| 600187 | 2/1967 | Canada. |
| 893191 | 2/1972 | Canada. |
| A0117113 | 8/1984 | European Pat. Off. |
| 55-39973 | 3/1980 | Japan. |
| 55-107743 | 8/1980 | Japan. |
| 56-135521 | 10/1981 | Japan. |
| 57-34118 | 2/1982 | Japan. |
| 58/13872 | 8/1983 | Japan. |
| 63-254756 | 10/1988 | Japan. |
| 2103224 | 4/1990 | Japan. |
| 3234727 | 10/1991 | Japan. |
| 915704 | 1/1963 | United Kingdom. |
| 963058 | 7/1964 | United Kingdom. |

OTHER PUBLICATIONS

Proposed Mechanism for the Curing of Epoxy Resins with Amine–Lewis Acid Complexes or Salts by James J. Harris and Samuel C. Temin, J. Ap. Pol. Sc., vol. 10, pp. 523–534 (1966).

On the thermal behaviour of some alkylammonium tetrafluoroborates by Zabinsa, Ferloni and Sanesi, Journ. Calorim., Anal. Therm. Thermodyn. Chim., V. 17, pp. 250–253 (1986).

Derwent Abstract, 91–349990/48, Japan, Feb. 13, 1990.
Derwent Abstract, 91–160746/21, Japan, Oct. 12, 1988.
Derwent Abstract, 82–27072E/14, Japan, Aug. 7, 1980.

*Primary Examiner*—Randy Gulakowski

[57] ABSTRACT

A class of compounds which inhibits the reaction of a polyepoxide with a curing agent at low temperatures including an epoxy resin composition containing a) a polyepoxide;
b) an amine or amide curing agent for the polyepoxide;
c) at least about 15 meq (per equivalent of polyepoxide) of a catalyst for the reaction of the polyepoxide with the curing agent; and
d) a cure inhibitor selected such that:
  (1) at about 171° C. the composition has a gel time that is at least about 50 percent longer than a similar composition without the inhibitor, and
  (2) at about 175° C. and higher the composition cures in no more than about 50 minutes such that the composition cures rapidly with high cross-link density because it has a high catalyst loading, while the inhibitor lengthens the gel time to permit laminating and other processing.

12 Claims, No Drawings

CURE INHIBITED EPOXY RESIN COMPOSITIONS AND LAMINATES PREPARED FROM THE COMPOSITIONS

CROSS REFERENCE TO RELATED APPLICATIONS

This is a continuation of application Ser. No. 08/146,652, filed Nov. 2, 1993, now abandoned, which is a continuation-in-part of copending application Ser. No. 07/848,477 (filed Mar. 6, 1992), now U.S. Pat. No. 5,314,720, which is a divisional of Ser. No. 07/526,487 (filed May 21, 1990), which is now abandoned.

BACKGROUND OF THE INVENTION

This invention relates to epoxy resin compositions.

Cured and partially cured epoxy resins are used in laminates. A common process used in preparing glass laminates involves passing a glass cloth to be coated with an epoxy resin composition through a bath containing the resin, a curing agent for the resin and a catalyst for the curing reaction. The concentration of catalyst is usually about 0.1 parts catalyst per 100 parts epoxy resin (by weight). Generally the bath contains one or more organic solvents in which the various components are dissolved or dispersed, with a solid content of between about 45 and about 90 percent. The glass is resident in the bath for time sufficient to coat it with a mixture of the resin, curing agent and catalyst for the curing reaction.

Thereafter the coated glass is passed through a heated zone to remove remaining solvent by evaporation. Generally, this zone is at a temperature of between 120° C. and 200° C. The residence time in this zone is sufficient to allow the solvents to be completely volatilized away. Thereafter the glass cloth, coated with the resin, curing agent and catalyst from which the solvents have been removed, may be controllably, partially cured by exposing it to temperatures at which curing occurs. Such a product is referred to as a prepreg. The process of partially-curing the resin is referred to as "B-staging."

The prepregs may then be stacked or formed into a shape and exposed to conditions under which the curing agent and resin completes the cure. In general, this involves contacting the various components of a laminate at elevated temperatures under pressure, for a period of time sufficient for the epoxy resin to further cure. Usually the pressure is provided by some kind of a press. Once the laminate is removed from the press it may, optionally, be exposed to elevated temperature for a period of time to complete the curing reaction. In this curing process the resin coating on the glass cloth flows and mixes with the coating on adjacent glass clothes thereby resulting in a fusing of the glass layers together, via the cured epoxy resin.

High glass-transition temperatures are desirable for many uses, therefore methods of increasing the glass-transition temperatures are desired. It is further desired to significantly decrease the time necessary to achieve complete cure. Prepreg producers and laminators desire a composition which facilitates faster processing. This allows the more efficient utilization of processing equipment. In order to facilitate faster processing, the coated substrates must be exposed to higher temperatures or the epoxy resin compositions must contain higher levels of catalysts. Unfortunately, both solutions result in less control over the curing reaction and solvent can be trapped in the final product thereby affecting the ultimate properties.

In one embodiment, a process referred to as continuous pressing technology is used. In this process the prepregs are contacted at much higher temperatures than in conventional laminate processing for shorter periods, e.g. at temperatures around 210° C. for 2 to 4 minutes. It is very difficult to achieve complete cure under such conditions. One potential solution to this is to add a larger amount of catalyst or accelerator to the epoxy resin. Unfortunately if additional catalyst is added in the coating bath, then the ability to remove the solvent without significant curing of the epoxy resin, or to controllably partially cure the epoxy resin, is significantly reduced.

What is needed is an epoxy resin composition that does not undergo significant cure at temperatures at which solvents may be removed. What is further needed is an epoxy resin that can be controllably B-staged or partially advanced. What is further needed is an epoxy resin composition which when coated on a substrate can be processed faster without hurting the ultimate properties.

Frequently, for many products prepared using epoxy resins and cured epoxy resins several different entities may perform different parts of the manufacturing process. For example, one entity may make the resin, a second entity may make the resin formulations used to impregnate the reinforcing material, and a third may make a prepreg, or other article to be used, while a fourth would make the final product such as a laminate or printed circuit board. Frequently the entity producing the prepreg or laminate has no expertise or desire to make the formulation. Therefore, it is desirable that a formulator be able to make a composition useful in coating the materials to be laminated. The problem is that if the epoxy resin curing agent and catalyst are preformulated, the formulation may not have significant long-term storage stability. Under such circumstances the formulation may undergo curing and therefore not be useful to the prepreg or laminate manufacturer. What is further needed is a composition containing resin, curing agent and catalyst that can be stored between formulation and use.

SUMMARY OF THE INVENTION

One aspect of the present invention is an epoxy resin composition comprising:
a) a polyepoxide;
b) an amine or amide curing agent for the polyepoxide;
c) at least about 15 milliequivalents (meq) (per equivalent of polyepoxide) of a catalyst for the reaction of the polyepoxide with the curing agent; and
d) a Lewis acid cure inhibitor that forms a complex with the catalyst selected such that:
  (1) at about 171° C. the composition has a stroke cure gel time that is at least about 50 percent longer than a similar composition without the inhibitor, and
  (2) at temperatures of 175° C. or higher the composition cures in no more than about 60 minutes.

The test for stroke-cure gel time and curing are described hereinafter.

A second aspect of the present invention is a process for making a prepreg comprising the steps of:
(1) impregnating a substrate with a curable composition as previously described;
(2) drawing off solvent from the composition and partially curing the composition at a temperature of 80° C. to 190° C. to form a B-staged prepreg; and
(3) cooling the B-staged prepreg and storing it at a temperature less than 50° C.

A third aspect of the present invention is a prepreg comprising:

(1) a fiber-containing substrate; and (2) a partially-cured curable composition of claim 1 impregnated upon the substrate.

The invention has several advantages. A composition comprising a polyepoxide, a curing agent, a catalyst (also known as an accelerator), and inhibitor can be exposed to temperatures at which any solvent present is removed by evaporation without significant curing of the epoxy resin. Furthermore, in the presence of the inhibitor, the concentration of catalyst present may be significantly higher without resulting in cure of the epoxy resin composition during a solvent removal process. A higher crosslink density (as indicated by higher glass-transition temperature in the cured product) may be achieved by using a larger concentration of catalyst. The final products prepared from these epoxy resin compositions may, therefore, exhibit a higher glass-transition temperature. Those resin compositions which contain a polyepoxide, curing agent, catalyst and inhibitor have a significantly longer shelf life at ambient temperatures. The compositions of this invention may be processed at faster speeds as a higher concentration of catalyst may be used in processing. Preferably this composition is preferably stable for more than two days, more preferably stable for more than two months, and most preferably stable for six months or more, at ambient temperatures.

DETAILED DESCRIPTION OF THE INVENTION

The compositions described herein may be found in various forms. In particular, the various compositions described may be found in powder form, or alternatively in solution or dispersion. In those embodiments where the various compositions are in solution or dispersion, the various components of the composition may be separately dissolved in a solvent suitable for that component, then the various solutions are combined and intimately mixed. Note the solvents for the various components are preferably chosen such that the solvents are miscible with one another. Intimately mixed as used herein refers to agitating a mixture of solutions which is a relatively homogeneous solution or dispersion. Alternatively, the components may be dissolved or dispersed in the same solvent or dispersant. In those embodiments wherein the compositions are partially cured or advanced, the compositions of this invention may be found in a powder form, solution form, or coated on a particular substrate.

Polyepoxide as used herein refers to a compound containing more than one epoxy moiety. In another embodiment it refers to a mixture of compounds which contains, on average, more than one epoxy moiety per molecule. Polyepoxide as used herein includes partially advanced epoxy resins i.e. the reaction of a polyepoxide and a curing agent, wherein the reaction product has an average of at least one unreacted epoxide unit per molecule.

Preferred compounds having an average of more than one epoxide group per molecule which can be employed herein include, epoxy resins such as, for example, the glycidyl ethers of polyhydric phenols, i.e. compounds having an average of more than one aromatic hydroxyl group per molecule such as, for example, dihydroxy phenols, biphenols, bisphenols, halogenated biphenols, halogenated bisphenols, alkylated biphenols, alkylated bisphenols, trisphenols, phenol-aldehyde novolac resins, substituted phenol-aldehyde novolac resins, phenol-hydrocarbon resins, substituted phenol-hydrocarbon resins, or any combination thereof and the like.

Polyepoxides (such as polyglycidyl ethers of a polyhydroxy hydrocarbon) are preferably the reaction product of an epihalohydrin with a compound having on average more than one aromatic hydroxyl group. The preparation of such compounds is well known in the art. See Kirk-Othmer, *Encyclopedia of Chemical Technology*, 3rd Ed., Vol. 9, pp 267–289. Examples of preferred epoxy resins and their precursors are described in Davis et al., U.S. Pat. No. 4,251,594 (Feb. 17, 1981); Berman et al., U.S. Pat. No. 4,604,317 (Aug. 5, 1986); Wang, U.S. Pat. No. 4,672,103 (Jun. 9, 1987); Bogan, U.S. Pat. No. 4,710,429 (Dec. 1, 1987); Walker et al., U.S. Pat. No. 5,066,735 (Nov. 19, 1991) (individually and in the claimed mixtures); Koenig et al., U.S. Pat. No. 5,112,932 (May 12, 1992); and Bertram et al., U.S. Pat. No. 5,169,473 (Dec. 8, 1992), which are incorporated herein by reference.

Preferable aromatic hydroxyl-containing compounds which can be employed herein include, for example, compounds having an average of more than one phenolic hydroxyl group per molecule. Suitable such compounds include, for example, dihydroxy phenols, biphenols, bisphenols, halogenated bisphenols, alkylated bisphenols, trisphenols, hydrogenated bisphenols, phenol-aldehyde resins, halogenated phenol-aldehyde novolac resins, alkylated phenol-aldehyde novolac resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins, or any combination thereof and the like.

Among even more preferred classes of polyhydroxy hydrocarbons and halogenated polyhydroxy hydrocarbons are the bisphenols; halogenated bisphenols; hydrogenated bisphenols; novolac resins, i.e., the reaction product of phenols and simple aldehydes, preferably formaldehyde; and polyalkylene glycols.

Preferable epoxy resins include, for example, the diglycidyl ethers of resorcinol, catechol, hydroquinone, biphenol, bisphenol A, bisphenol AP (1,1-bis(4-hydroxylphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A, or any combination thereof and the like.

Other preferable epoxide compounds are the glycidyl ethers of compounds having an average of more than one aliphatic hydroxyl group per molecule such as, for example, aliphatic diols, polyether diols, polyether triols, polyether tetrols, any combination thereof and the like. Also suitable are the alkylene oxide adducts of compounds containing an average of more than one aromatic hydroxyl group per molecule such as, for example, the ethylene oxide, propylene oxide, or butylene oxide adducts of dihydroxy phenols, biphenols, bisphenols, halogenated bisphenols, alkylated bisphenols, trisphenols, phenol-aldehyde novolac resins, halogenated phenol-aldehyde novolac resins, alkylated phenol-aldehyde novolac resins, hydrocarbon-phenol resins, hydrocarbon-halogenated phenol resins, or hydrocarbon-alkylated phenol resins, or any combination thereof and the like.

In one embodiment polyepoxides refers to an advanced epoxy resin which is the reaction product of one or more polyepoxides, as described previously, with one or more polyhydroxy hydrocarbons or a halogenated derivative thereof. Such polyhydroxy hydrocarbons have been described previously. Alternatively, a polyepoxide can be reacted with a carboxyl substituted hydrocarbon. A carboxyl substituted hydrocarbon is a compound with a hydrocarbon backbone and one or more carboxyl moieties, preferably more than one, and most preferably two. Preferably such compounds correspond to Formula 1;

$$R^5 (COOH)_u \qquad 1$$

wherein $R^5$ is $C_{1-40}$ hydrocarbyl moiety (optionally containing oxygen along the backbone), and u is an integer of one or greater. $R^5$ is preferably a $C_{1-40}$ straight- or branched-chain alkane or alkene, optionally containing oxygen. Preferably u is 1 to 4, and most preferably 2. Fatty acids and fatty acid dimers are among the useful carboxylic acid substituted hydrocarbons. Included in the fatty acids are caproic acid, caprylic acid, capric acid, octanoic acid, versatic acid, decanoic acid, lauric acid, myristic acid, palmitic acid, stearic acid, palmitoleic acid, oleic acid, linoleic acid, linolenic acid, erucic acid, pentadecanoic acid, margaric acid, arachidic acid, and dimers thereof.

In another embodiment, the polyepoxide is the reaction product of a polyepoxide and a compound containing more than one isocyanate moiety, a polyisocyanate. Preferably the polyepoxide is an epoxy-terminated polyoxazolidone. It preferably has from 5 to 30, more preferably 5 to 20, most preferably 10 to 20 weight percent isocyanate content and has from 50 to 100 percent of the original isocyanate groups converted to oxazolidone rings and from 0 to 50 percent of the original isocyanate groups converted to isocyanurate rings whenever prepared according to the process described herein.

Epoxy-terminated polyoxazolidone (isocyanate modified epoxy resin) are preferably prepared by the process described in Koenig, U.S. Pat. No. 5,112,932 (May 12, 1992), which is incorporated herein by reference.

Amine- and amide-containing curing agents in the present invention are compounds that contain on average more than one active hydrogen atom, wherein the active hydrogen atoms are bonded to the same nitrogen atom or to different nitrogen atoms. Examples of suitable curing agents include: compounds that contain a primary amine or amide moiety and compounds that contain two or more primary or secondary amine or amide moieties linked to a common central organic moiety. Examples of suitable amine-containing curing agents include: diethylene triamine, triethylene tetramine, dicyandiamide, melamine, pyridine, cyclohexylamine, benzyldimethylamine, benzylamine, diethylaniline, triethanolamine, piperidine, N,N-diethyl-1,3-propane diamine, and the like, and soluble adducts of amines and polyepoxides and their salts, such as described in U.S. Pat. Nos. 2,651,589 and 2,640,037.

Polyamides are preferably the reaction product of a polyacid and an amine. Examples of polyacids used in making these polyamides include, among others, 1,10-decanedioic acid, 1,12-dodecanedienedioic acid, 1,20-eicosadienedioic acid, 1,14-tetradecanedioic acid, 1,18-octadecanedioic acid and dimerized and trimerized fatty acids. Amines used in making the polyamides include preferably the aliphatic and cycloaliphatic polyamines as ethylene diamine, diethylene triamine, triethylene tetramine, tetraethylene pentamine, 1,4-diamino-butane, 1,3-diaminobutane, hexamethylene diamine, 3-(N-isopropylamino)propylamine and the like. Especially preferred polyamides are those derived from the aliphatic polyamides containing no more than 12 carbon atoms and polymeric fatty acids obtained by dimerizing and/or trimerizing ethylenically unsaturated fatty acids containing up to 25 carbon atoms. These preferred polyamides preferably have a viscosity between 10 and 750 poises at 40° C., and preferably 20 to 250 poises at 40° C. Preferred polyamides also have amine values of 50 to 450.

Preferred curing agents are aliphatic polyamines, polyglycoldiamines, polyoxypropylene diamines, polyoxypropylenetriamines, amidoamines, imidazolines, reactive polyamides, ketimines, araliphatic polyamines (i.e. xylylenediamine), cycloaliphatic amines (i.e. isphoronediamine or diaminocyclohexane) menthane diamine, 3,3-dimethyl-4,4-diamino-dicyclohexylmethane, heterocyclic amines (aminoethyl piperazine), aromatic polyamines, (methylene dianiline), diamino diphenyl sulfone, mannich base, phenalkamine, N,N'N"-tris(6-aminohexyl) melamine, and the like. The most preferred curing agents are cyanamide, dicyandiamide, and its derivatives, diaminodiphenyl sulfone and methylene dianiline.

The ratio of curing agent to epoxy resin is preferably suitable to provide a fully cured resin. The amount of curing agent which may be present may vary depending upon the particular curing agent used. The curable composition preferably contains from about 0 to 150 parts of curing agent per hundred parts of resin (phr), more preferably from about 0.5 to 30 phr curing agent, more highly preferably from 1.0 to 10.0 phr curing agent, and most preferably from 2 to 4 phr curing agent. The equivalent ratio of epoxy moieties to curing moieties is preferably at least about 0.8:1 and more preferably at least about 0.9:1. The equivalent ratio is preferably no more than about 1.5:1 and more preferably no more than about 1.2:1.

Catalysts useful in this invention are those catalysts which catalyze the reaction of a polyepoxide with a curing agent, and which remains latent in the presence of the inhibitor at lower temperatures. Examples of curing catalysts are described in Walker et al., U.S. Pat. No. 4,868,059 (Sep. 19, 1989) and Bertram et al., U.S. Pat. No. 5,169,473 (Dec. 8, 1992) which are incorporated herein by reference.

Examples of preferred catalyst are compounds containing amine, phosphine, heterocyclic nitrogen, ammonium, phosphonium, arsonium or sulfonium moieties. More preferred catalyst are the heterocyclic nitrogen and amine-containing compounds and even more preferred compounds are heterocyclic nitrogen-containing compounds.

Examples of such heterocyclic nitrogen compounds include those described in copending, allowed patent application titled "Latent, Curable, Catalyzed Mixtures of Epoxy Containing and Phenolic Hydroxyl Containing Compounds" Ser. No. 07/274,250 filed Nov. 18, 1988, now U.S. Pat. No. 4,925,901, relevant parts incorporated herein by reference.

Among referred heterocyclic nitrogen-containing compounds useful as catalysts are those possessing in the heterocyclic ring (1) a substituted C=N—C group and (2) a secondary amino group, including the imidazoles, such as the substituted imidazoles and benzimidazoles.

Preferable heterocyclic secondary and tertiary amines or nitrogen-containing compounds which can be employed herein include, for example, imidazoles, imidazolidines, imidazolines, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsazines, phenothiazines, pyrrolines, indolines, piperidines, piperazines, combinations thereof and the like.

A more detailed description of the chemistry of the imidazoles and benzimidazoles including their properties and structural formulas is found in the book by Klaus Holmann entitled "Imidazole and Its Derivatives" published by Interscience Publishers, Inc., New York (1953). Especially preferred are the alkyl-substituted imidazoles; 2,5-chloro-4-ethyl imidazole; and phenyl substituted imidazoles, and mixtures thereof. Even more preferred are 2-methyl imidazole; 2-ethyl, 4-methyl imidazole; 1,2-dimethylimidazole; and 2-phenyl imidazole. Especially preferred is 2-methyl imidazole.

Among preferred tertiary amines that may be used as catalysts are those mono- or polyamines having an open chain or cyclic structure which have all of the amine hydrogen replaced by suitable substituents, such as hydrocarbon radicals, and preferably aliphatic, cycloaliphatic or aromatic radicals. Examples of these amines include, among others, methyl diethanol amine, triethylamine, tributylamine, dimethyl benzylamine, triphenylamine, tricyclohexyl amine, pyridine, quinoline, and the like. Preferred amines are the trialkyl, tricycloalkyl and triaryl amines, such as triethylamine, triphenylamine, tri(2,3-dimethylcyclohexyl)amine, and the alkyl dialkanol amines, such as methyl diethanol amines and the trialkanolamines such as triethanolamine. Weak tertiary amines, e.g., amines that in aqueous solutions give a pH less than 10, are particularly preferred. Especially preferred tertiary amine accelerators are benzyldimethylamine and tris-dimethylaminomethyl phenol.

The catalyst should be present in quantities of at least 15 meq of catalyst for each equivalent of epoxy resin. The concentration of catalyst is preferably at least about 20 meq per equivalent of epoxy resin. It is preferably no more than about 50 meq per equivalent and more preferably no more than about 25 meq per equivalent. The higher than normal catalyst loadings make it possible to have very rapid cure at higher temperatures. When the catalyst is 2-methylimidazole, the concentration is preferably at least about 0.3 phr (parts catalyst per 100 parts resin, by weight) and more preferably at least about 0.4 phr. The concentration is preferably no more than about 1 phr, and more preferably no more than about 0.5 phr.

The composition contains a Lewis acid curing inhibitor, which forms a complex with the catalyst. The complexes exist in equilibrium with the uncomplexed catalyst and complexing agent. At any given moment a portion of the catalyst is complexed with the complexing agent and a portion is not. The portion of free catalyst is dependent upon several variables, including the complexing agent, its concentration relative to the catalyst, the temperature of the mixture and the solvents used to dissolve the boric acid and resin formulations.

The inhibitor and its concentration are selected such that the resin does not gel too fast at temperatures that are ordinarily used to impregnate and laminate a composite. (Stroke-cure gel time of a resin can be determined by test DOWM101210-TE92A, which is described in the working examples). The stroke cure gel time of the resin containing the inhibitor at about 171° C. is preferably at least about 50 percent longer than the gel time of a similar composition containing no inhibitor. The stroke cure gel time is preferably at least about 100 percent longer, and more preferably at least about 200 percent longer. At about 171° C., the stroke cure gel time of the composition is preferably more than 70 seconds, highly preferably more than 100 seconds, more preferably more than 200 seconds, more highly preferably more than 250 seconds, and most preferably more than 300 seconds. It is desirable to keep the gel time as long as possible, but it is seldom more than about 1000 seconds for useful compositions. The composition preferably exhibits no significant change in its gel time when stored at about 20° C. to 25° C. or less over a period of at least 2 days, more preferably at least about 10 days and most preferably at least about 30 days.

The inhibitor should also dissociate from the catalyst at curing temperatures, so that the excess catalyst causes more rapid-curing than compositions with an ordinary catalyst content and no inhibitor. A sample is considered cured when its glass-transition temperature changes by no more than 3° C. between first and second testing by IPC test method: 2.4.25 (revision B dated December 1987) as described in the testing methods section hereinafter. (This test may not meet every user's definition of a "fully cured" resin, since different users may have different performance criteria that a cured resin must meet. Some users may require further curing to meet all performance criteria. However, the test does establish that under curing conditions there is at least as much catalyst activity as—and preferably more catalyst activity than—a system with ordinary catalyst loadings and no inhibitor). The composition should be cured in no more than about 60 minutes at temperatures of about 175° C. The composition highly is preferably cured in no more than about 50 minutes, preferably in no more than about 45 minutes, more preferably in no more than about 30 minutes, and most preferably in no more than about 20 minutes.

Examples of suitable inhibitors include halides, oxides, hydroxides and alkoxides of zinc, tin, titanium, cobalt, manganese, iron, silicon, boron, aluminum and similar compounds (other than boron halides)—for instance boric acid, boroxines (such as trimethoxyboroxine), boron oxide, alkyl borates, zinc halides (such as zinc chloride) and other Lewis acids that tend to have a relatively weak conjugate base. When the formulation is intended for use in electrical laminates, then the inhibitor preferably contains no significant levels of halide. The most preferred inhibitor is boric acid. Boric acid as used herein refers to boric acid or derivatives thereof, including metaboric acid and boric anhydride.

The molar ratio of catalyst to inhibitor is selected to provide the results previously described. The optimum ratio may vary from catalyst to catalyst and from inhibitor to inhibitor. In most cases, the molar ratio of inhibitor to catalyst is preferably at least about 0.6:1, more preferably at least about 0.75:1 and most preferably at least about 1:1. The molar ratio of inhibitor to catalyst is preferably no more than about 3:1, more preferably no more than about 1.4:1 and most preferably no more than about 1.35:1.

For example, the preferred molar ratio of boric acid to imidazole compound is from about 0.85:1 to about 1.12:1 while the most preferred ratio is in the range of from about 0.93:1 to about 1.1:1. For phosphonium compounds, the preferred ratio is from about 0.95:1 to about 1.35:1, more preferably from about 1.1:1 to about 1.25:1 moles of acid per mole of phosphonium compound. When the amount of boric acid is less than about 0.6 mole per mole of imidazole the catalyst is less latent and begins to approach the reactivity of the original imidazole prior to reaction with the acid or acid salt. When the amount of boric acid is more than about 1.4 moles per mole of phosphonium, the catalyst becomes less latent. When the amount of acid or acid salt is more than about 1.4 moles per mole of imidazole, the catalyst becomes less latent.

The inhibitor and catalysts may be separately added to the compositions of this invention, or may be added as a complex. The complex is formed by contacting and intimately mixing a solution of the inhibitor with a solution of the catalyst. Optionally, an acid having a weak nucleophilic anion may be present. Such contacting generally is performed at ambient temperature, although other temperatures may be used, for example, temperatures of from 0° C. to 100° C., more preferably from 20° C. to 60° C. The time of contacting is that sufficient to complete formation of the complex, and depends on the temperature used, with from 1 to 120 minutes preferred, and 10 to 60 minutes more preferred. Preferred solvents for the catalyst and the inhibitor are polar solvents, with alcohols being preferred. Lower alcohols are even more preferred, with methanol most preferred.

The catalysts can be employed alone or in combination with other catalysts, preferably catalytic products resulting from reacting the onium or amine compounds or a combination thereof with an inorganic acid containing a weak nucleophile. By the term "weak nucleophile" or "weak nucleophilic," it is meant that the material has a nucleophilicity value "n" of greater than zero and less than 2.5 as described by C. G. Swain and C. B. Scott in *J. Am. Chem. Society*, Vol. 75, p 141 (1953) which is incorporated herein by reference. Particularly suitable inorganic acids having a weak nucleophilic anion or weak nucleophile include, for example, fluoboric acid, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid and any combination thereof and the like. Most particularly the acid is fluoboric acid.

The polyepoxide, curing agent, catalyst and inhibitor are dissolved in a solvent. Preferably the concentration of solids in the solvent is at least about 50 percent and no more than about 75 percent solids. Such solvents or diluents include those which are volatile and escape from the composition prior to cure. Solvents are usually ketones, alcohols, glycol ethers, aromatic hydrocarbons and mixtures thereof. Preferred examples of solvents included methylethyl ketone, methylisobutylkeytone, propylene glycol methylether, ethylene glycol methylether, methyl amyl ketone, methanol, isopropanol, toluene, xylene, dimethylformamide and the like. Examples of suitable solvents are described in Berman et al., U.S. Pat. No. 4,756,954 (Jul. 12, 1988). A single solvent may be used, but in many applications a separate solvent is used for each component. It is preferable that the various solvents used be miscible with one another. Preferred solvents for the epoxy resins are ketones, including acetone, methylethylketone and the like. Preferred solvents for the curing agents are slightly polar solvents, amides, e.g., DMF, ether alcohols such as methyl, ethyl, propyl or butyl ethers of ethylene glycol, diethylene glycol, propylene glycol or dipropylene glycol, for example, ethylene glycol monomethyl ether, or 1-methoxy-2-propanol. The catalysts and inhibitors are preferably dissolved in polar solvents, in particular alcohols, preferably lower alkanols and most preferably methanol.

The compositions of the present invention may be impregnated upon a reinforcing material to make laminates, such as electrical laminates. The reinforcing material which may be coated with the compositions of this invention include any material which would be used by the skilled artisan in formation of composites, prepregs, laminates and the like. Examples of appropriate substrates include fiber-containing materials such as cloth, mesh, web, fibers, or the like. Preferably, such materials are made from glass, fiberglass, paper, plastics such as aromatic polyamides, graphite and the like. Preferred materials include glass or fiberglass, in cloth or web form. Other additives may also be present including fillers, dyes, pigments, surfactants, flow control agents and the like.

Compositions containing polyepoxide, curing agent, catalyst and inhibitor may be contacted with an article used in any method known to those skilled in the art. Examples of such contacting methods include powder coating, spray coating, and contacting the article with a bath containing the composition. In a preferred embodiment the article is contacted with the composition in a bath.

In one embodiment, the reinforcing material is contacted with an intimately mixed bath comprising: a polyepoxide; a curing agent for the polyepoxide; an inhibitor; and a compound which catalyzes the curing of the polyepoxide with the curing agent, dissolved and intimately admixed in a solvent or a mixture of solvents. The coating occurs under conditions such that the reinforcing material is coated with epoxy resin, curing agent, inhibitor, and catalyst. Thereafter the coated reinforcing materials are passed through a heated zone at a temperature sufficient to cause the solvents to evaporate, but below the temperature which the polyepoxide undergoes significant cure during the residence time in the heated zone. The reinforcing material preferably has a residence time in the bath of from 0.1 min to 10 min, more preferably from 0.3 min to 8 min, and most preferably from 0.5 min to 3 min. The temperature of such bath is preferably from 0° C. to 100° C., more preferably from 10° C. to 40° C. and most preferably from 15° C. to 30° C. The residence time of the coated reinforcing material in the heated zone is from 0.5 to 15 min, more preferably from 1 to 10 min, and most preferably from 1.5 to 5 min. The temperature of such zone is sufficient to cause any solvents remaining to volatilize away yet not so high as to result in a complete curing of the components. Preferable temperatures of such zone are from 80° C. to 230° C., more preferably from 100° C. to 200° C., and most preferably from 140° C. to 190° C. Preferably there a is means in the heated zone to remove the solvent, either by passing an inert gas through the oven, or drawing a slight vacuum on the oven. In many embodiments the coated materials are exposed to zones of increasing temperature. The first zones are designed to cause the solvent to volatilize so it can be removed. The later zones are designed to result in partial cure of the polyepoxide, i.e., so called B-staging.

The inhibited catalysts of the present invention are latent at low temperatures, meaning that the curable resin will substantially stop curing after it is B-staged if the curable resin is cooled down, preferably to below 50° C. and more preferably to about room temperature (20° C. to 25° C.). The B-staged resin is then storage stable, preferably for at least about 10 days, more preferably for at least about 20 days, and most preferably for at least about 30 days. This makes it possible to interrupt curing of prepregs after B-staging, to ship or store the B-staged prepregs until they are needed, and to cure them to make laminates at a later time.

One or more sheets of prepreg are preferably processed into laminates with one or more sheets of electrically-conductive material such as copper. In such further processing, one or more segments or parts of the coated reinforcing material are brought in contact with one another and/or the conductive material. Thereafter, the contacted parts are exposed to elevated pressures and temperatures sufficient to cause the epoxy resin to cure wherein the resin on adjacent parts react to form a continuous epoxy resin matrix between and about the reinforcing material. Before being cured the parts may be cut and stacked or folded and stacked into a part of desired shape and thickness. The pressures use can be anywhere from about 1 to about 200 kg/cm$^2$, with from about 10 to about 100 kg/cm$^2$ being preferred. The temperature used to cure the resin in the parts or laminates, depends upon the particular residence time, pressure used, and resin used. Preferred temperature which may be used are between about 100° C. and about 190° C., more preferably between about 120° C. and about 180° C., and most preferably between about 140° C. and about 175° C. The residence times are preferably from about 10 min to about 120 min, more preferably from about 20 to about 90 min, and most preferably from about 30 to about 50 min.

One embodiment of such a process is known as a continuous process. In such process, the reinforcing material is taken from the oven and appropriately arranged into the desired shape and thickness and pressed at very high temperatures for short times, in particular such high temperatures are from about 180° C. to about 250° C., more preferably about 190° C. to about 210° C., at times of about 1 to about 10 min and from about 2 to about 5 min. Such high speed pressing allows for the more efficient utilization of processing equipment. In such embodiments the preferred reinforcing material is a glass web or woven cloth.

In some embodiments it is desirable to subject the laminate or final product to a post cure outside of the press. This step is designed to complete the curing reaction. The post cure is usually performed at from 130° C. to 200° C. for from 20 to 200 minutes. This post cure step may be performed in a vacuum to remove any components which may volatilize.

The ultimate coated reinforced parts prepared from the composition of this invention often demonstrate a higher Tg than where the compositions not within the scope of this invention are used. In some embodiments the Tg is at least 5° C. higher than parts prepared similarly using conventional resins. More preferably the Tg is increased by at least 10° C. For instance, the glass-transition temperature of cured resin made from brominated bisphenol-A epoxy resin and dicyanodiamide is preferably at least 140° C. and more preferably at least about 144° C., as measured by differential scanning calorimetry (DSC). The parts prepared using the composition of this invention, demonstrate a higher solvent resistance, e.g., demonstrate a pick-up of less than 1.0% N-methyl pyrrolidone. It is theorized, without intending to be bound, that these differences result from higher crosslink density, due to the higher catalyst loading.

Furthermore such parts exhibit a higher thermal performance as there is little or no solvent entrapped. The formulations of this invention preferably exhibit longer gel times at certain temperatures as compared to prior art formulations.

ILLUSTRATIVE EXAMPLES

The following examples are presented to illustrate the invention and are not intended to limit the scope of the claims. Unless otherwise stated all parts and percentages are by weight.

Testing Methods

The following test methods are used unless stated otherwise in the examples. Unless stated otherwise, all parts and percentages are by weight.

Stroke-Cure Gel Time

The test for stroke-cure gel time is available from The Dow Chemical Company as DOWM101210-TE92A (effective 26 May 1992). The published test is modified by changing the hardener/catalyst solution in paragraph (1) to reflect the actual composition to be tested. The test is summarized as follows:

(1) A hardener/catalyst solution is made by blending one or more solvents, a curing agent and a catalyst to reflect the curable composition to be tested. The materials are blended until all the dicyandiamide is dissolved. The blend should not be stored for more than one month. (Hardener/catalyst solutions in the present application ordinarily contain 173.00 g dimethylformamide, 173.00 g propylene glycol monomethyl ether, 28.00 g dicyandiamide and a desired quantity of 2-methylimidazole—all available from Aldrich Chemical Company. However, the tester should modify the solution to reflect the actual curable composition that is being tested.)

(2) The bottom side of a Model C01-T thermocouple (or equivalent) is pasted to a hot plate using a small amount of OMEGATHERM™ 201 thermally conductive paste, or equivalent. The thermocouple is attached to a Model 450-ATT thermocouple thermometer (or equivalent). The hot plate control is adjusted until a stable temperature of 171° C.±0.5 is obtained. The hot plate should be located in a constant temperature area away from drafts to prevent temperature variations.

(3) A solution that contains 40 g of resin solids is added to a 4 oz. bottle, and 15.00 g of hardener/catalyst solution is added. Inhibitor may be added to the resin, before or immediately after the hardener/catalyst solution is added. The solutions are immediately blended and are left for one hour (from the time the hardener/catalyst solution was added) before beginning the test.

(4) A 0.5 to 0.7 mL sample of varnish is applied to the hot plate, and a timer is started. The sample rests undisturbed on the hot plate for 60 seconds±1. Then the sample is stroked with a wooden spatula by pushing the resin puddle back and forth over an area of about 1 in$^2$ with the same side of the spatula in contact with the resin. The resin will thicken as it is stroked. Eventually, it becomes stringy, and then becomes a rubbery gel. That is the endpoint. The timer is stopped and the time is recorded. The resin is scraped from the plate using a razor blade being careful not to scratch the plate surface.

(5) The test is repeated three times, and the average time to form a gel is recorded.

Curing

A sample is considered cured when its glass-transition temperature does not change by more than 3° C. when the sample is tested twice by differential scanning calorimetry. The glass-transition temperature method is modified from the test published by The Institute for Interconnecting and Packaging Electronic Circuits in the IPC Test Methods Manual as test 2.4.25 (revision B, dated December 1987):

(1) A resin sample obtained from the stroke-cure gel time test is baked in a 175° C. oven for the desired period of time.

(2) A specimen is cut from the sample and mounted in a standard aluminum sample pan. (The sample should not be higher than the edge of the pan). The sample is not a laminate, and so references to copper in the published test method can be ignored. An empty pan is used as a reference.

(3) The glass-transition temperature is measured using a DuPont Model 912 differential scanning calorimeter or equivalent, starting well below the point of interest and increasing temperature at a rate of 10° C./min until 175° C. is reached. The specimen is held at 175° C. for 15 min (±0.5) and then cooled over a period of 10 minutes to initial conditions.

(4) A second scan is carried out to a temperature of at least 180° C. The inflection points of the two scans are calculated by computer and taken to be the glass-transition temperatures of the sample. If the first and second scan are more than 3° C. different, the sample is not cured.

EXAMPLES

Examples 1–89 are incorporated herein by reference from the same numbered examples in Gan et al., U.S. Ser. No. 07/848,477 (filed Mar. 6, 1992), now U.S. Pat. No. 5,319,720. The incorporated examples show compositions that contain epoxy resins, curing agents, catalysts and boric acid inhibitor. The examples also show curing of those compositions and properties of cured products. Tests for curing and gel time in the incorporated examples are for purposes of those examples only, and do not necessarily reflect gel or cure times referred to in the claims.

Example 90

Trimethoxyboroxine Inhibitor

The following mixture is agitated for one hour:

100 parts—80 weight percent solids solution of brominated epoxy resin (prepared from tetrabromobisphenol A and diglycidyl ether of bisphenol A) dissolved in acetone;

4.5 parts—10 percent solution of 2-methylimidazole in dimethylformamide (DMF); and 27 parts—10 percent solution of dicyandiamide in a mixture of DMF and glycol ether; and 1.12 parts—trimethoxyboroxine.

The gel time is tested as described previously. The gel time of the resin is about 249 seconds at about 171° C. The gelled resin is fully cured in no more than about 50 minutes at 175° C. After curing for 60 minutes, the glass-transition temperature of the resin is about 162° C.

Example 91

Trimethoxyboroxine Inhibitor

The following varnish is agitated for several hours:

50 parts—80 weight percent solids solution of brominated epoxy resin (prepared from tetrabromobisphenol A and diglycidyl ether of bisphenol A) dissolved in acetone;

26.36 parts—epoxy resin prepared from epichlorohydrin and bisphenol A;

14.01 parts—tetrabromobisphenol A;

9.63 parts—acetone 7.5 parts—10 percent solution of 2-methylimidazole in dimethylformamide (DMF); and 20 parts—10 percent solution of dicyandiamide in a mixture of DMF and glycol ether; and 0.87 parts—trimethoxyboroxine.

The gel time is tested as described previously. The gel time of the varnish is about 226 seconds at about 171° C. The gelled varnish is fully cured in no more than about 50 minutes at 175° C.

A 6 in. by 6 in. prepreg of varnish and woven E-glass is cured according to the following conditions: Starting at a temperature of 250° F. and a pressure of 20.8 psi, the temperature is increased to 350° F. at 5° F./min, and the pressure is increased to 500 psi at a rate of 20.8 psi/min. After curing for 60 minutes at 350° F. and 500 psi, the laminate is cooled to 100° F. at 500 psi pressure. The glass-transition temperature of the prepreg is about 161° C.

Example 92

Zinc Chloride Inhibitor

The following mixture is agitated for one hour:

100 parts—80 weight percent solids solution of brominated epoxy resin (prepared from tetrabromobisphenol A and diglycidyl ether of bisphenol A) dissolved in acetone;

4.5 parts—10 percent solution of 2-methylimidazole in dimethylformamide (DMF); and 27 parts—10 percent solution of dicyandiamide in a mixture of DMF and glycol ether; and 4.4 parts—10 percent solution of zinc chloride in methanol.

The gel time is tested as described previously. The gel time of the resin is about 273 seconds at about 171° C. After curing for 60 minutes, the glass-transition temperature of the resin is about 144° C.

Example 93

Cure Time for Boric Acid Inhibited System

A mixture of epoxy resin (80 percent solids in acetone), 0.45 phr of 2-methylimidazole (10 percent solids in DMF), 2.7 phr dicyandiamide (10 percent solids in DMF/glycol ether mixture) and 0.40 phr boric acid (18 percent solids in ethylene glycol) is cured at 175° C. for the time shown in Table XII. Two glass-transition temperatures are measured as described previously, and set out in Table XII. The test shows that the mixture cures in 20 minutes or less.

TABLE XII

| Cure Time (min) | Tg 1 (°C.) | Tg 2 (°C.) |
| --- | --- | --- |
| 60 | 143 | 140 |
| 45 | 141 | 141 |
| 30 | 143 | 143 |
| 20 | 143 | 144 |

Example 94

Cure Time for Trimethylboroxine Inhibited System

Example 93 is repeated using 1.12 phr trimethoxyboroxine in the place of boric acid. The results are set out in Table XIII. The test shows that the resin is cured in no more than 45 minutes time.

TABLE XIII

| Cure Time (min) | Tg 1 (°C.) | Tg 2 (°C.) |
| --- | --- | --- |
| 60 | 162 | 162 |
| 45 | 159 | 161 |
| 30 | 152 | 161 |

Examples 95–106

Alternative Cure Inhibitors

The process of Example 90 is followed, substituting the inhibitors in Table XIV in the quantities in Table XIV for the trimethylboroxine shown in Example 90. Those results are shown in Table XIV. (A) is not an example of the invention.

TABLE XIV

| Ex | Inhibitor | Quantity (phr) | Gel Time (sec) |
|---|---|---|---|
| 95 | $BCl_3$ | 0.45 | 460 |
| 96 | $TiCl_4$ | 0.80 | 516 |
| 97 | $TiCl_4$ | 0.20 | 460 |
| 98 | $TiCl_4$ | 0.10 | 300 |
| 99 | $SnCl_4$ | 0.20 | 366 |
| 100 | $CoCl_2$ | 0.20 | 275 |
| 101 | $CoCl_2$ | 0.10 | 150 |
| 102 | $CrCl_3$ | 0.13 | 265 |
| 103 | $MnCl_2$ | 0.20 | 322 |
| 104 | $FeCl_2$ | 0.10 | 198 |
| 105 | $FeCl_3$ | 0.10 | 248 |
| 106 | $SiCl_4$ | 0.20 | 438 |
| A | None | 0 | 85 |

We claim:

1. An epoxy resin composition comprising
a) a polyepoxide;
b) a curing quantity of curing agent;
c) about 0.3 to 1 parts, per 100 parts of polyepoxide by weight, of an immidazole catalyst for the reaction of the polyepoxide with the curing agent; and
d) a Lewis acid cure inhibitor that is an oxide, a hydroxide or an alkoxide of zinc, tin, titanium, cobalt, manganese, iron, silicon, boron or aluminum, having a molar ratio of inhibitor to catalyst of between 0.6:1 and 3:1.

2. The composition of claim 1 wherein the inhibitor is boric acid, a boroxime, boron oxide, or an alkyl borate.

3. The composition of claim 1 which further comprises a solvent.

4. The composition of claim 3 wherein the quantity of catalyst is about 0.4 to 0.5 phr.

5. The composition of claim 4 wherein the cure inhibitor is a boroxine, boron oxide, an alkyl borate or a zinc halide.

6. The composition of claim 3, wherein the polyepoxide is polyglycidyl ether of a compound containing more than one aromatic hydroxyl group.

7. The composition of claim 3 wherein the curing agent contains amine groups or amide groups.

8. The composition of claim 3 wherein the equivalent ratio of polyepoxide to curing agent is about 0.8:1 to about 1.5:1.

9. The composition of claim 3 wherein the concentration of curing agent about 0.5 phr to about 30 phr.

10. The composition of claim 9 wherein the curing agent is dicyandiamide.

11. The composition of claim 3 wherein the molar ratio of catalyst to inhibitor is about 0.75:1 to about 1.4:1.

12. The composition of claim 3 wherein the molar ratio of catalyst to inhibitor is about 1 to about 1.4.

* * * * *